Patented May 1, 1928.

1,668,225

UNITED STATES PATENT OFFICE.

GERALD L. WENDT, OF CHICAGO, ILLINOIS, ASSIGNOR TO STANDARD OIL COMPANY, OF WHITING, INDIANA, A CORPORATION OF INDIANA.

REMOVAL OF SULPHUR AND SULPHUR COMPOUNDS FROM HYDROCARBON OIL.

No Drawing.  Application filed July 16, 1924. Serial No. 726,379.

The present invention relates to the removal of sulphur and sulphur compounds from hydrocarbon oil, and particularly the lighter oils, such as gasoline, naphtha, burning oils, and the like. It has to do more particularly with the treatment of those oils which, after "sweetening" with the usual sodium plumbite or "doctor" solution, on rerunning are found to again become "sour"; that is, indicate by doctor and corrosion tests the presence of sulphur compounds.

In refinery practice, many distillate oils are sweetened, or treated with aqueous sodium plumbite (doctor) solution (with or without added sulphur) and are subsequently redistilled. With many of these oils it is found that the redistilled oils show the presence of hydrogen sulphide, and are again "sour". A particularly important example of such oil is found in pressure distillate, the distillate from oils cracked under pressure for the formation of lighter oils, such as gasoline.

In accordance with the present invention oils of the hereinbefore described type are, before rerunning, treated with doctor solution in the usual manner, the doctor solution employed being the usual solution of litharge containing 0.1 to 1% PbO in a 10 to 20° Baumé caustic soda solution. If desired doctor "bottom settlings" or the precipitate, chiefly of lead sulphide, formed in previous treatments of oil may be added at the same time. After treatment with the doctor solution, there are added to the oil lower mercaptan compounds, by which term I designate the mercaptans (or soluble mercaptides thereof) having less than 10 carbon atoms and boiling below 350° F., these being preferably added in solution. The proportion of mercaptan solution may be readily determined by experiment, as it varies with different oils, and in general, it is found that a quantity sufficient to provide 1 to 5 parts of mercaptan in 5000 parts of oil is sufficient. The mercaptan solution and the oil are thoroughly mixed and are again treated with doctor solution as before. The usual precipitation of sulphides and mercaptides takes place, and the treated oil may be then redistilled without becoming sour.

The lower mercaptans may be added as such, or may be first dissolved in water or in an alkaline solution, such as a caustic soda solution of, say, 10–20° Baumé. It has been found convenient in practice to use the spent caustic solution from the treatment of naphtha, this solution containing originally 15 to 20% sodium hydroxide and being reduced in use to from 2 to 10% sodium hydroxide strength. This solution in general contains appreciable proportions of lower sodium mercaptides. The sodium sulphide also present in the spent caustic solution may be removed, as is generally advantageous, by reaction with lime or with spent lime solutions through which refinery gases have been passed, this solution containing some calcium hydrogen sulphide, which also reacts with sodium sulphide. The spent caustic from the washing of naphtha, preferably after removal of the sodium sulphide, may be used as the source of lower mercaptans in the process as hereinbefore described. Thus, spent caustic and spent lime solutions may be mixed in the proportion of two parts of the former and three parts of the latter, and the resulting solution, after separation from the precipitate may be used in treating the oil prior to redistillation. These proportions may be varied according to the proportion of spent lime required to precipitate the sulphides present in the spent caustic solution.

In the treatment of the oil to be rerun, treatment with doctor solution before treatment with the mercaptans has been hereinbefore described. If desired the mercaptans may be added before the doctor treatment, but such procedure is found in general to involve excessive losses of reagents and is not preferred.

I claim:

1. The method of sweetening hydrocarbon oils of the class herein described comprising adding lower mercaptan compounds thereto and subsequently treating with doctor solution.

2. The method of sweetening hydrocarbon oils of the class herein described comprising treating the oils with doctor solution, adding lower mercaptan compounds to the treated oil, again treating with doctor solution, and distilling the oil.

3. The method of sweetening hydrocarbon oils of the class herein described comprising treating the oils with doctor solution, adding to the treated oil a solution containing mercaptans derived from the washing of refinery gases with caustic soda solution, and again treating the oil with doctor solution.

GERALD L. WENDT.